(12) United States Patent
Lorenzi et al.

(10) Patent No.: US 11,906,437 B2
(45) Date of Patent: Feb. 20, 2024

(54) SYSTEMS AND METHODS FOR SPECTROSCOPIC ANALYSES OF DIAMONDS

(71) Applicant: Università degli Studi di Milano—Bicocca, Milan (IT)

(72) Inventors: Roberto Lorenzi, Milan (IT); Alberto Maria Felice Paleari, Milan (IT); Andrea Zullino, Milan (IT)

(73) Assignee: Università degli Studi di Milano - Bicocca, Milan (IT)

( * ) Notice: Subject to any disclaimer, the term of this patent is extended or adjusted under 35 U.S.C. 154(b) by 449 days.

(21) Appl. No.: 16/956,521

(22) PCT Filed: Dec. 20, 2018

(86) PCT No.: PCT/IB2018/060450
§ 371 (c)(1),
(2) Date: Jun. 19, 2020

(87) PCT Pub. No.: WO2019/123383
PCT Pub. Date: Jun. 27, 2019

(65) Prior Publication Data
US 2022/0178835 A1 Jun. 9, 2022

(30) Foreign Application Priority Data
Dec. 21, 2017 (IT) .................. 102017000148104

(51) Int. Cl.
*G01N 21/87* (2006.01)
*G01N 21/64* (2006.01)
*G01N 21/65* (2006.01)

(52) U.S. Cl.
CPC ............ *G01N 21/87* (2013.01); *G01N 21/64* (2013.01); *G01N 21/65* (2013.01)

(58) Field of Classification Search
CPC ......... G01N 21/87; G01N 21/64; G01N 21/65
See application file for complete search history.

(56) References Cited

U.S. PATENT DOCUMENTS 3,867,032 A * 2/1975 Bruck .................... G01N 21/87
356/30
4,291,975 A * 9/1981 Raccah .................. G01N 21/87
356/30

(Continued)

FOREIGN PATENT DOCUMENTS

CA 2765898 * 12/2010 ............ C30B 29/04
EP 0226608 A1 7/1987

(Continued)

OTHER PUBLICATIONS

Hainschwang et al., "Luminescence spectroscopy and microscopy applied to study gem materials: a case study of C centre containing diamonds", Mineralogy and Petrology, vol. 107, No. 3, Feb. 13, 2013, pp. 393-413.

(Continued)

*Primary Examiner* — Alexander Satanovsky
*Assistant Examiner* — Sharah Zaab
(74) *Attorney, Agent, or Firm* — MH2 TECHNOLOGY LAW GROUP LLP (57) ABSTRACT

A spectroscopic analysis apparatus may include: a sample holder to retain a gem in analysis position; a first light source configured to emit a first primary beam at an excitation wavelength toward the analysis position to generate emission or diffusion of light; a second light source configured to emit a second primary beam comprising UV light toward the analysis position to impact on the first side; an optical focusing system to focus the light emitted or diffused by the first side in a secondary optical beam; a spectral dispersion device arranged to collect and spatially disperse the secondary optical beam; a first photodetector device arranged to (Continued)

collect the dispersed light and to output a distribution of spectral intensity as a function of emission wavelength; a second photodetector device to collect visible light transmitted through the gem; and a film of fluorescent material to UV light.

20 Claims, 3 Drawing Sheets (56) References Cited

U.S. PATENT DOCUMENTS

| | | | |
|---|---|---|---|
| 4,488,821 A | | 12/1984 | Wenckus |
| 4,616,939 A | | 10/1986 | Gitlis |
| 4,799,786 A | | 1/1989 | Gerrard |
| 4,919,533 A | * | 4/1990 | Bowley ............... G01V 8/02 356/30 |
| 5,811,824 A | | 9/1998 | Smith et al. |
| 5,883,389 A | | 3/1999 | Spear et al. |
| 6,265,884 B1 | | 7/2001 | Menashi et al. |
| 7,277,161 B2 | | 10/2007 | Claus |
| 7,362,109 B2 | | 4/2008 | Loginov |
| 2007/0148374 A1 | * | 6/2007 | Twitchen ............... A44C 17/00 428/29 |
| 2016/0161420 A1 | | 6/2016 | Zhu et al. |

FOREIGN PATENT DOCUMENTS

| | | | | |
|---|---|---|---|---|
| EP | 2743681 | * | 6/2014 | ............ G01N 21/64 |
| GB | 2295227 A | | 5/1996 | |
| WO | 2015127990 A1 | | 9/2015 | |
| WO | WO2015127990 | * | 9/2015 | ............ G01N 21/87 |
| WO | 2017025825 A1 | | 2/2017 | |
| WO | WO2017025825 | * | 2/2017 | ............... G01J 1/16 |

OTHER PUBLICATIONS

International Search Report and Written Opinion in corresponding International Application No. PCT/IB2018/060450, 13 pages.

* cited by examiner

SYSTEMS AND METHODS FOR SPECTROSCOPIC ANALYSES OF DIAMONDS

CROSS-REFERENCE TO RELATED APPLICATION(S)

This application is a national stage entry from International Application No. PCT/IB2018/060450, filed on Dec. 20, 2018, in the Receiving Office ("RO/IB") of the International Bureau of the World Intellectual Property Organization ("WIPO"), and published as International Publication No. WO 2019/123383 A1 on Jun. 27, 2019; International Application No. PCT/IB2018/060450 claims priority from Italian Patent Application No. 102017000148104, filed on Dec. 21, 2017, in the Italian Patent and Trademark Office ("IPTO"), the entire contents of all of which are incorporated herein by reference.

FIELD OF THE INVENTION

The present invention relates to a system and a method for combining spectroscopic analyses to determine whether a gem is a diamond of natural origin or synthetic origin.

BACKGROUND ART

Spectroscopic analysis of gems, namely diamonds, has reached a high level of in-depth knowledge in the field of materials science, where the photo-physical properties of diamond are of great interest for many technological applications. Scientific knowledge of the optical properties of a diamond has an important impact in the field of gemology, as the commercial interest for the diamond is mainly associated with the value of the gem that depends on the optical properties of purity and/or color and, not secondarily, on the evaluation of the natural or artificial origin of the gem.

Gemology applications of spectroscopic findings, such as the possibility of providing a positive identification of diamond from the spectrum of Raman scattered light (as uniquely determined by the crystal structure of carbon in its solid diamond form) or those useful to determine the natural or synthetic nature of diamond and its color from the emission or optical absorption of particular defects in the crystal structure, require the use of multiple complex optical instruments and advanced scientific knowledge for handling measurements and interpreting results. Such instruments and knowledge are mainly available at specialized research centers and laboratories and require considerable investments. For these reasons, currently available portable gemological analysis devices are mainly characterized by a trade-off of price, reliability of diagnostic results, and operational complexity, which is not always beneficial.

Systems are also known which use electric measures to separate diamond from its imitations, as provided in U.S. Pat. No. 6,265,884. This document discloses an apparatus for determining the gem type based on electrical conductivity, wherein an electric circuit that includes the gem is part of a circuit path for measuring electrical conductivity. Moissanite and other diamond imitations can be distinguished from natural diamonds based on their different electrical conductivities.

In U.S. Pat. Nos. 4,488,821 and 4,616,939, imitations of diamonds are distinguished from natural diamond through thermal conductivity measures. U.S. Pat. No. 7,362,109 concerns an apparatus for distinguishing gems based on electrical and/or thermal conductivity as automatically detected upon contact with the gem to be analyzed.

While electrical and/or thermal conductivity-based systems have a simpler operation and a lower cost, and are more commonly used in the field of goldsmiths' craft and jewelry, they may be less reliable than spectroscopic analysis.

Systems that use light sources to probe the optical response of a gem, upon emission or absorption, have a considerably higher production cost than electric measure-based devices. In addition, the information content of diagnostic results is generally limited to individual and specific optical properties in order to reduce the complexity of the result-interpreting device.

U.S. Pat. No. 7,277,161 discloses a method of qualifying a diamond based on the light transmitted through the diamond, wherein the diamond is irradiated with light at a wavelength between 225 nm and 300 nm and the light transmission is measured and compared with a reference value that corresponds to a transmission through a reference diamond.

In U.S. Pat. No. 5,883,389 a diamond is irradiated with UV light at a wavelength of 225 nm or less, such that only a surface region of the diamond is irradiated, and produces a luminescence pattern. The luminescence and fluorescence emitted by the diamond is thus observed. Once UV irradiation terminates, phosphorescence is also observed. Photoluminescence patterns have been visually studied by an operator using magnification means, i.e. a microscope.

EP 0226608 discloses a method that comprises the steps of (a) placing a sample in a beam of monochromatic light with a wavelength between 450 and 650 nm; (b) passing Raman radiation scattered from the sample through a filter that only allows the passage of the characteristic frequency of the scattered Raman radiation of a diamond, and (c) detecting the radiation so filtered.

Instruments based on spectroscopic analysis of diamond can provide information for discriminating diamonds from other gems, for distinguishing type I from type II diamonds, for discriminating synthetic and natural diamonds.

The cubic crystallographic structure of tetracoordinated carbon determines its spectrum of Raman light scattered from a natural diamond, the spectrum being characterized by a single intense narrow line at 1332 $cm^{-1}$, at ambient temperature. M. S. Liu et al., in "Temperature dependence of the first-order Raman phonon line of diamond", published in Phys. Rev. B 61, pages 3391-3395 (1999), study micro-Raman scattering from monocrystalline diamonds at temperatures ranging from 77 to 873 K. The measures show that the frequency of the phonon and the width of the line are temperature-dependent.

Synthetic diamond creation, as well as changing the color of natural diamonds by artificial treatments, lead to materials which inevitably whose defect state, on atomic scale, differs from that of a natural diamond. WO 2015/127990 discloses a method and an apparatus for spectroscopic analysis to distinguish a yellow diamond whose color has a natural or artificial origin.

Spectroscopic analysis was used to distinguish natural diamond from CVD (Chemical Vapor Deposition) diamond. U.S. Pat. No. 5,811,824 relates to a method and an apparatus for checking whether a diamond has a layer of synthetic diamond deposited thereupon by CVD based on the absorption spectrum. The method comprises irradiating at least two areas of a diamond surface with UV radiation and observe the intensity of radiation at a wavelength between 230 nm 320 nm that is transmitted from each area of the diamond, to detect a reduced absorption of the radiation transmitted in at least one of the two zones, indicative of the presence of synthetic diamond.

The aforementioned studies show that the spectrum of optical absorption in the ultraviolet (UV) region, at wavelengths between about 240 nm and 300 nm, is very different in type I transparent colorless natural diamonds (color degrees D-J) as compared with what observed in type I transparent diamonds, irrespective of their natural or synthetic origin. Namely, type I transparent colorless natural diamonds (color degree D to J) have very high absorbance values in the near UV region, corresponding to an optical transmittance of less than 1/100, versus a transmittance close to 1 for type II diamonds.

The fluorescence of silicon vacancy [SiV]$^-$ defect centers, often referred to in the art as SiV, has been long noted in CVD diamond.

C. D. Clark et al. in "Silicon defects in diamond", published in Phys. Rev. B (1995), vol. 51, n. 23, pages 16681-16688, propose a study of absorption and photoluminescence spectra (excitation at 488 mm) in the range of temperatures from 1.8 to 77 K from CVD diamond films. The photoluminescence spectra show the presence of spectral lines near 1.682 eV. The authors conclude that spectral lines originate from defect centers associated with silicon impurities.

C. Wang et al. "Single photon emission from SiV centres in diamond produced by ion implantation", Journal of Physics B, vol. 39 (2006), pages 37-41, study CVD diamond samples in which $Si^{2+}$ ions have been implanted to analyze emission from SiV centers.

Commercial nitrogen-doped yellow to brown synthetic diamonds obtained by CVD are characterized using the imaging and spectroscopic techniques in "Spectroscopic studies of yellow nitrogen-doped CVD diamonds", A. M. Zaitsev, W. Wang, K. S. Moe, and P. Johnson, published in Diamond & Related Materials, vol. 68 (2016), pages 51-61.

A review of photoluminescence (PL) and Raman scattering studies on natural diamonds, high-pressure high-temperature (HPHT) and CVD generated diamonds or HPHT-treated natural diamonds was provided by T. Hainschwang et al., in "Luminescence spectroscopy and microscopy applied to study gem materials: A case study of C centre containing diamonds", Miner. Petrol. (2013), vol. 107, pages 393-413. The authors note, on pages 401-403, that an identifying prominent defect of CVD diamond emerging in PL spectra is the zero-phonon line (ZPL) doublet at 736.6 nm and 736.9 nm caused by SiV centers, although this defect can be seen in very rare cases in natural diamonds. Since the silicon center is stable at temperatures above 2200° C., it is visible in most HPHT-treated CVD diamonds.

H. Sternschulte et al. in "1.681-eV luminescence center in chemical-vapor-deposited homoepitaxial diamond films", Phys. Rev. B vol. 50 (1994), p. 14554, study the luminescence center at 1.681-eV, that is generally found in CVD diamond films, or in diamond films obtained by low temperature and ambient temperature homoepitaxial growth. PL spectra show various emissions characterized by the presence of SiV defects, including a narrow emission (with a width of the order of a few mm) at about 738 nm.

Fluorescence emissions of diamond also include an emission at about 884 nm, a few nm wide, caused by nickel (Ni) impurities and almost exclusively found in HPHT synthetic diamonds (see the above mentioned Hainschwang et al. paper).

R. C. Burns et al., in "Growth of high purity large synthetic diamond crystals", published in Diamond and Related Materials, vol. 8 (1999), pp. 1433-1437, show that almost colorless boron-doped synthetic diamonds tend to exhibit a strong, long-lasting fluorescence in the visible region. This property is not observed in type I natural diamonds and is very rarely found in type II natural diamonds.

SUMMARY OF THE INVENTION

The present invention relates to an apparatus for the analysis of transparent, substantially colorless gems of unknown composition and origin, that can perform a plurality of spectroscopic analyses and collect and process information from the measures to produce one or more diagnostic results.

An apparatus and a method of the invention are defined in claims 1 and 6.

In certain embodiments, the plurality of spectroscopic analyses includes measures of Raman scattering, ultraviolet (UV) transmittance, fluorescence in the red spectral region, e.g. 738 nm and 884 nm, and phosphorescence in the visible spectrum, mainly in the range between 400-600 nm, excited at a wavelength lower than or equal to 230 nm. The data is analyzed by the system and combined thereby to produce a set of diagnostic results concerning the distinction between diamonds and precious stones other than diamond and, in case of diamonds, the distinction between type I colorless natural diamonds, type II colorless synthetic CVD diamonds, type II colorless synthetic HPHT diamonds, potential type II colorless synthetic diamonds, and potential type II colorless natural diamonds.

As is generally known, the Raman scattering peak at 1332 $cm^{-1}$ uniquely defines the gem being analyzed as monocrystalline diamond, irrespective of its natural or synthetic origin. Using an optical excitation beam at a wavelength ranging between 600 nm and 680 nm, the Raman line of diamond is included in the spectral region between about 650 nm and 748 nm. For example, the Raman line is located at 712 nm for an excitation wavelength of 650 nm.

Advantageously, the apparatus is able provide the result of the diagnosis of the sample under examination in a manner that is intelligible by a user, even when he/she has no special scientific knowledge for result analysis.

DETAILED DESCRIPTION

Figure 1:
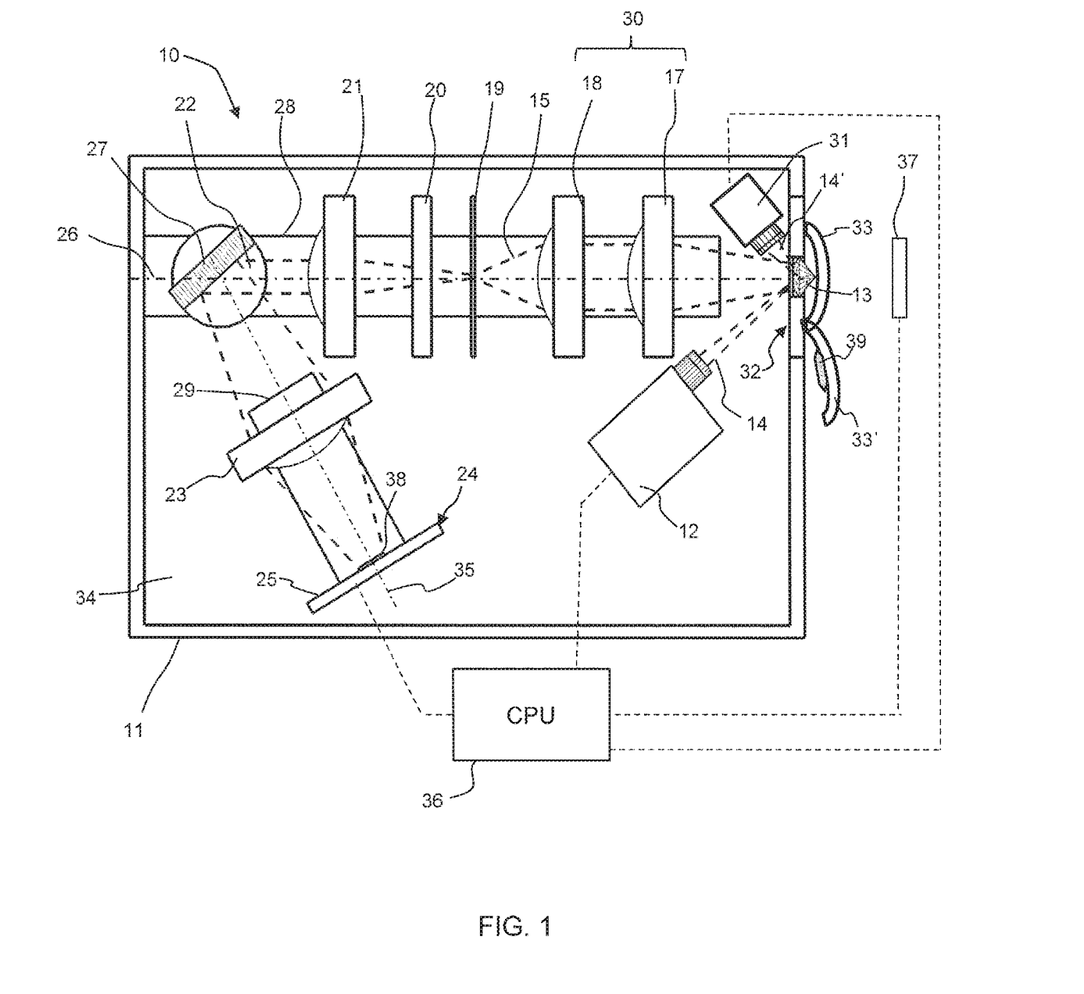
FIG. 1 is a schematic top view of an apparatus for analyzing a gem according to one embodiment of the present invention.

FIG. 1 is a schematic top view of an apparatus for spectroscopic analysis of a gem according to one embodiment of the present invention, An apparatus 10 for spectroscopic analysis comprises a first light source 12 configured to emit a first primary light beam 14. The first light source 12 is arranged in such a position as to direct the first primary light beam 14 onto a sample 13, which is a gem and in particular a colorless gem. The gem under examination is at ambient temperature. Therefore, the detected spectra are spectra measured at room temperature.

The first light source 12 is configured to emit the first primary light beam 14 at a wavelength$_1$ between 550 nanometers (nm) and 680 nm. More preferably, it is configured to emit monochromatic light in the visible red spectral region, at a wavelength$_1$ between 600 nm and 680 nm. For example, the first light source 12 is a light emitting diode (LED) that emits monochromatic light at a wavelength $\lambda_1$=650 nm. In a further example, the first light source 12 is a laser device which emits at $\lambda_1$=633 nm. The sample 13 is exposed at room temperature to the first primary light beam 14, which is designed to excite emission and scattering by the sample 13.

The spectroscopy apparatus 10 comprises a second light source 31 configured to emit UV light, preferably radiation at a wavelength equal to or less than 230 nm. Preferably, the second light source 31 is configured to emit a non-monochromatic light beam comprising radiation at a wavelength equal to or less than 230 nm which may cause phosphorescence emission. For example, the second light source 31 is a deuterium lamp which emits a continuous spectrum from 180 nm to 370 nm, optionally optically coupled to an optical filter (not shown) which is configured to transmit light at a wavelength of less than 230 nm. As described in greater detail below, the first light source 12 and the second light source 31 can be activated separately, according to the spectroscopic analysis to be conducted.

The light emitted and/or scattered by the sample 13, induced by irradiation from the first light source 12 and indicated with a secondary optical beam 15, is collected by a first optical focusing system 30 which includes, for example, two focusing lenses 17 and 18, with the second lens 18 located downstream from the first lens 17 with respect to the sample 13, like in the exemplary embodiment of FIG. 1. In another embodiment, the first optical focusing system 30 consists of a single focusing lens, for example a biconvex lens. The secondary optical beam 15 is focused by the first optical focusing system 30 on a slit 19 to form an image of the light that comes from the sample 13. The width of the slit 19 is preferably selected to obtain an image of the slit 19 on a detector device, as described in greater detail below, with a width of the order of one pixel. Preferably, an optical filter 20 is arranged to receive the secondary optical filter beam 15 from the slit 19, to filter out any light of the first primary light beam 14 diffused or elastically scattered at the same wavelength as the incident beam from the sample 13 or from its surface. In certain embodiments, the wavelength-selective optical filter 20 selected is a passband or step optical filter. For example, the excitation wavelength is 633 nm and a high-pass filter with a cut-off wavelength of 640 nm is selected. Once it has passed through the slit 19 and has been preferably filtered to select a wavelength region, the secondary optical beam 15 is collimated by a collimating lens 21 on an optical spectral-dispersion element 22, which is configured to spatially distribute the secondary optical beam 15 according to the wavelength. Preferably, the optical spectral-dispersion element 22 is a diffraction grating. In the embodiment of FIG. 1, the optical spectral-dispersion element 22 is mounted to a structure 27 positioned to stably support the optical spectral-dispersion element 22 and receive the secondary optical beam 15 at a correct angle. The dispersed optical beam is collected by a convergent lens 23 and focused on a first photodetector device 24. As is known per se, the first photodetector device 24 comprises a sensor 38 electrically connected to a processing circuit 25, e.g. a microprocessor, configured to receive and process the output signals from the sensor 38 as is known per se and to produce spectral intensity distribution x-y data that are adapted to be displayed as a picture in a display or be transmitted to an external unit for processing. In certain embodiments, the sensor 38 is a charge-coupled device (CCD) or complementary metal-oxide-semiconductor (CMOS) sensor.

In the embodiment of FIG. 1, the passive optical elements 19-22 for focusing, collimating and dispersing the secondary optical beam 15 from the sample 13 are arranged along a first optical axis 26. The optical spectral-dispersion element 22 directs the secondary beam toward the first photodetector device 24 along a second optical axis 35. The passive optical elements 19-22 are placed along the first optical axis 26 by being fastened to a first supporting structure 28 by means of usual fastening arrangements. Similarly, passive optical elements (e.g., convergent lens 23) are placed along the second optical axis 35 by being fastened to a second supporting structure 29 by means of usual fastening arrangements.

The optical system of the apparatus 10 is housed in a container 11 with a top opening that may be closed by a lid (not shown). The sample 13 is fixed in a sample holder 32 that holds it in place. Preferably, the sample holder 32 comprises a through opening and a mounting and/or clamping mechanism to hold the sample 13 (e.g., gem) in position on the opening, so as to expose the first side of the sample 13 and a second side, opposite thereto. The radiation emitted by the first light source 12 or second light source 31 is incident upon a first side of the sample 13, when the latter is positioned on the sample holder 32.

In order to facilitate positioning of the sample 13 (e.g., gem) to be analyzed, the sample holder 32 is preferably mounted to a wall of the container 11 to thereby allow placement of the sample 13 without opening the container 11 that contains the optical and optoelectronic components.

Preferably, the sample holder 32 comprises a first lid 33 which encloses the sample 13 (e.g., gem) once it has been fixed to the mounting mechanism, at a second side of the sample 13, opposite to the first side. The first lid 33, arranged above the second side of the sample 13, is adapted to be removed or moved between a first position in which it encloses the sample 13, and a second position, in which it releases the sample 13, thereby allowing positioning or removal thereof.

Preferably, a plurality of interchangeable lids are provided for replacement or rotation. The plurality of lids are made of materials with different optical properties. In one embodiment, three interchangeable lids are provided (only two lids being shown): a first lid 33 that is transparent to visible light only and opaque to ultraviolet (UV) light, and a second lid 33' made of a material that is transparent to visible light and has its inner side, facing the second side of the sample 13 (e.g., gem), coated with a film 39 of a material that is fluorescent to UV radiation. In one embodiment, the plurality of covers comprises a third lid (not shown) opaque to visible light, to prevent ambient light from entering an interior 34 of apparatus 10 during the acquisition of spectra by the first photodetector device 24.

The apparatus further comprises a second photodetector device 37 (i.e., a visible light sensor), for example, a photodiode sensor. The second photodetector device 37 is arranged to collect the fluorescence generated by the film 39, at the second side of the sample 13 (e.g., gem), opposite to the first light incidence side of the sample 13. When the first or second lid 33, 33' is placed above the sample 13, the second photodetector device 37 is preferably arranged downstream from the first or second lid 33, 33', to thereby receive the visible light transmitted or emitted by the first or second lid 33, 33', when the latter is arranged above the sample 13.

The second lid 33' is used to observe the UV radiation transmitted through the sample 13 (e.g., gem), and the second photodetector device 37 is located at the film 39, the photodiode sensor being preferably masked from ambient light. The second photodetector device 37 detects the visible light generated by the fluorescent material of the film 39.

It shall be understood that in other embodiments, a film of fluorescent material may be interposed between the second side of the sample 13 (e.g., gem) and the second photodetector device 37. The film 39 of fluorescent material may be positioned either in a first position between the second side of the sample 13 and the second photodetector device 37, or in a second position external to the field of view of the second photodetector device 37.

In the case of use of the second lid 33', the film 39 may be a coating film glued or formed on the inner wall of the cover.

Detection of a fluorescence signal will likely indicate that the sample is a type II synthetic or natural diamond. The absence of fluorescence indicates that the diamond is a type I natural diamond.

The first lid 33 made of a material that is transparent to visible light and opaque to UV light is preferably used to detect a possible phosphorescence radiation, occurring especially in synthetic diamonds, when irradiated with UV radiation. The second light source 31 is turned on, irradiates the sample 13 for a given time interval and is then turned off. The emission of visible phosphorescence light continues for a relatively short time interval (e.g., a few seconds) once the second light source 31 (e.g., UV excitation) has been turned off.

The transparent material of the first lid 33 allows the visible light emitted by the diamond to pass through the first lid 33 and be detected by the second photodetector device 37.

If the first light source 12 is used to identify synthetic CVD diamonds by observation of the emission line at 738 nm, and HPHT diamonds by observation of emission lines at 794 nm and 884 nm, then the first lid 33 is opaque to visible radiation.

The first photodetector device 24, (i.e., an image sensor with a two-dimensional array of sensors) is connected to a central processing unit (CPU) 36. The (electric and/or electronic) logical connection lines are shown in FIG. 1 by dashed lines. In FIG. 1, the CPU 36 is external to the container 11 (e.g., is installed in a personal computer (PC) or in a mobile user terminal, such as a tablet or a smartphone). In one embodiment, the CPU 36 is housed in the container 11 and may be connected to a PC or another user terminal. The CPU 36 receives the electrical signals representative of spectral intensity distribution at its input.

Preferably, the first photodetector device 24 is configured to acquire a spectral region from 600 nm to 950 nm. The CPU 36 receives spectral intensity distribution from the first photodetector device 24 at its input and is configured to analyze spectral intensity as described hereinbelow.

In the preferred embodiments, the analysis of spectral intensity distribution and the determination of the natural or synthetic origin of the sample 13 (e.g., gem) are performed automatically by the CPU 36, and the analysis of fluorescence and phosphorescence signals output by the second photodetector device 37 also is carried out automatically.

Preferably, the CPU 36 is connected to the first and second light sources 12, 31 for selective activation of the first and second light source 12, 31. The CPU 36 may be attached to a display (not shown) for displaying the diagnostic results obtained from the measurements performed by first photodetector device 24 and/or the second photodetector device 37. The diagnostic result, as automatically processed by the CPU 36, may be a text message on the display which informs the user about the nature of the sample 13 (e.g., gem) to be tested. As described in greater detail below, referring to the flowchart of FIG. 2, the user is not required to examine the emission spectra or quantitative or spectral parameters of the output signals.

In one embodiment, not shown, the transmission intensity of UV light through the sample 13 (e.g., gem) is detected by a UV light sensor. In this embodiment, no fluorescent film is provided between the second side of the sample 13 and the UV sensor.

Figure 2:
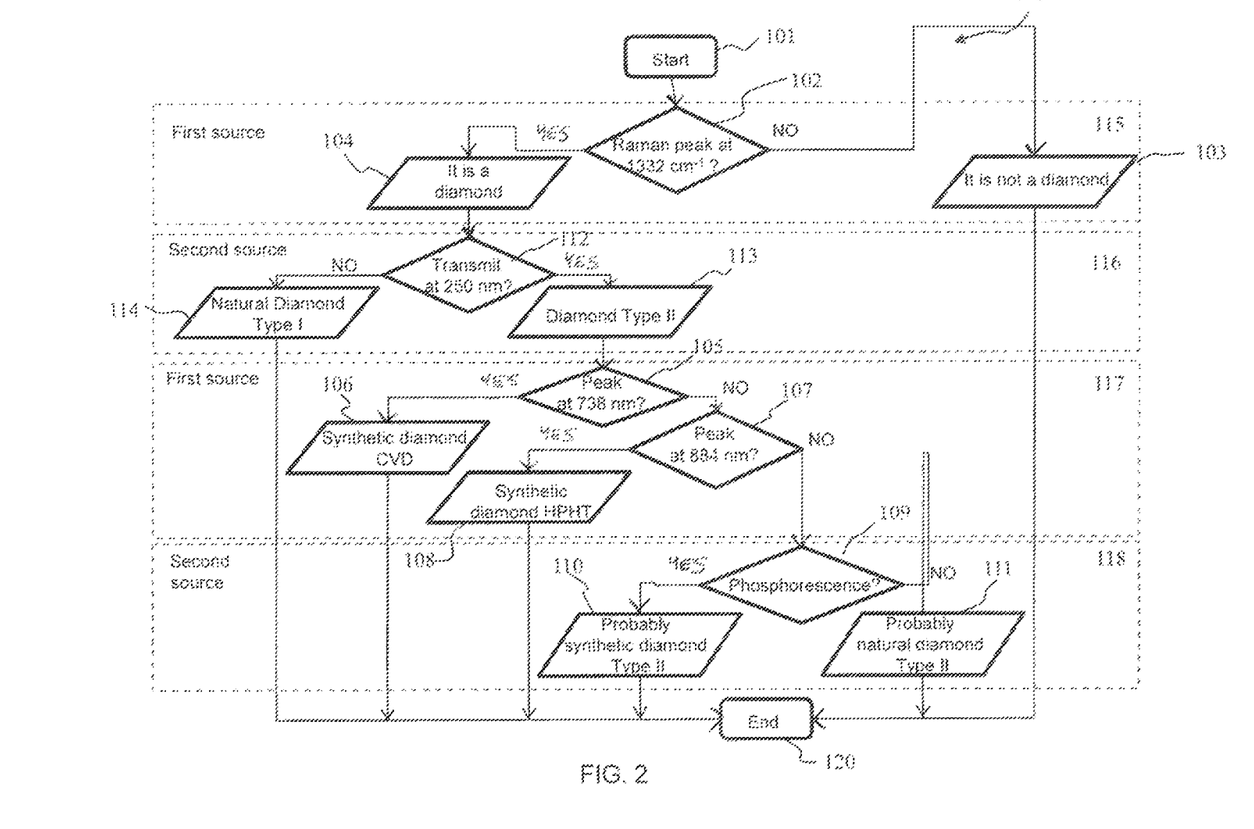
FIG. 2 is a flowchart of a method of spectroscopic analysis, according to one embodiment of the present invention, in case of a colorless gem of unknown composition and origin.

FIG. 2 is a flowchart of an automatic method of determining the nature of the gem being examined and if the gem is a diamond, the natural or synthetic origin and possibly the type thereof. The process is executed by a CPU, e.g. the CPU 36 described with reference to FIG. 1.

A colorless diamond-type gem is placed in the sample holder 32 and a spectroscopic measurement is performed by activating the first light source 12 at an excitation wavelength $\lambda_I$ and by detecting an emission/scattering spectrum produced by the gem, using the first photodetector device 24. Upon receipt of spectral intensity distribution data versus wavelength, i.e. in short spectral distribution, a spectroscopic analysis algorithm 100 is initialized (step 101). In the next step 102, spectral intensity distribution is analyzed to determine the presence or the absence of a Raman intensity peak, corresponding to a Raman displacement (i.e., a difference in wave numbers between diffused light and the excitation wavelength) equal to 1332 cm$^{-1}$.

In particular, in step 102, the method illuminates the sample 13 (e.g., gem) with a radiation of wavelength $X_1$, to check for the presence of an intensity peak of diffused light at a wavelength $\lambda_R$, with $(1/\lambda_R)=(1/\lambda_1)-1332$ cm$^{-1}$ (with $\lambda_I$ and $\lambda_R$ expressed in cm), and with a width of the order of nm. For example, the algorithm 100 checks whether the intensity of light $I_R$ at the wavelength $\lambda_R$ is greater than an intensity threshold value $(I_R)_t$, defined as $(I_R)_t=3S+((I_R)_p+(I_R)_d)/2$, with $(I_R)_p$ and $(I_R)_d$ being the intensity values as measured at the wavelengths $\lambda_R-\Delta\lambda$ and $\lambda_R+\Delta\lambda$, respectively, and 3S is a value equal to 3 times the average amplitude of noise fluctuations, which corresponds to the standard deviation of the intensity values as measured when the first light source 12 is off in a preset wavelength range, preferably higher than $2\Delta\lambda$, which comprises the relevant wavelengths. The value $\Delta\lambda$ is a predetermined positive nm value (e.g., 3 nm) which is defined as comprising the Raman peak centered at the wavelength $\lambda_R$, considering the width of the Raman peak (about 1 nm) and the experimental uncertainty in instrument calibration (of nm order).

If as a result of the analysis performed in step 102 according to check 115, a Raman peak is determined to be absent, the algorithm 100 establishes that the sample 13 is not a diamond (step 103) the program terminates (step 120) by outputting an indication that the sample 13 is not a diamond. In one embodiment, outputting an indication in output comprises displaying a text message on a display connected to the CPU 36.

If, as a result of the analysis, the Raman intensity peak is determined to be present, the algorithm establishes that the gem is a diamond (104) and proceeds to check 116 whether the diamond is a type I natural diamond or a type II synthetic or natural diamond. When type I natural diamonds are illuminated with UV radiation, they exhibit a strong optical absorption in the UV spectral region, for instance at about 250 nm. This optical absorption in the UV is usually not detected in type II diamonds, irrespective of their origin.

After the step 104, the first light source 12 is turned off and the second light source 31 is turned on, so that the first side (e.g., the one inside container 11) of the sample is irradiated with UV light. As the second light source 31 is on, the UV radiation transmitted through the sample 13 (e.g., gem) is detected by the second side, opposite to the first side of the sample 13 (e.g., outside the container 11), so that the presence or absence of a significant optical absorption in the UV region can be checked. During this check, the second lid 33' is placed above the sample 13 such that the UV light transmitted by the sample 13 will interact with the fluorescent film. The visible light emitted from the second side of the sample 13 hits the film 39 thereby causing a fluorescence emission in the visible spectrum, which is detected by the second photodetector device 37. In one embodiment, the CPU 36 receives the fluorescence signal that comes from the second photodetector device 37 and transmits it as an input to the algorithm 100, which analyzes the signal by checking whether the fluorescence intensity $I_T$ emitted by the film 39 is greater than or equal to or less than a threshold value $(T)_v$ (step 112). For example, the fluorescence signal threshold value is $(I_T)_v=10S$, where the value 10S is ten times the average amplitude of noise fluctuations as calculated from the standard deviation of the intensity values measured when the source is off over a preset wavelength range.

If the colorless diamond being examined absorbs radiation in the UV region, i.e. the fluorescence intensity is $I_T \leq (I_T)_v$, the algorithm establishes that the diamond is a type I natural diamond (114). If the colorless diamond does not absorb radiation in the UV, e.g. the intensity $I_T > (I_T)_v$, the algorithm establishes that the diamond is of type II (113). The result 114 terminates the program (120) and outputs an indication that the gem is a type I natural diamond.

The result 113 causes the process to continue with the analysis of the spectral intensity induced by the first primary light beam 14 emitted from the first light source 12 (data received in step 101) to check whether the colorless type II diamond type is natural or, if it is synthetic, whether it is a CVD or HPHT diamond (check 117).

The check 117 comprises, after activation of the first light source 12, carrying out a step 105 of checking the spectral distribution for the presence or absence of an intensity peak at a wavelength of approximately 738 nm, associated with SiV centers, typically observed in a synthetic CVD diamond.

In step 105, the spectral distribution received as an input in step 101, is analyzed by ascertaining the presence or absence of an intensity emission peak $I_C$ at a wavelength of about $\lambda_C=738$ nm. In one embodiment, the step 105 comprises checking whether the intensity in the range $\lambda_C-\Delta\lambda$ and $\lambda_C+\Delta\lambda$ with $\Delta\lambda$ being a predetermined positive value, e.g. of nm order, is greater than a threshold value $(I_C)_t$. For example, $(I_C)_t=3S+((I_C)_p+(I_C)_d)/2$ is calculated from the intensity values $(I_C)_p$ and $(I_C)_d$, as measured, at the wavelengths $\lambda_C-\Delta\lambda$ and $\lambda_C+\Delta\lambda$ respectively and the value 3S is a value equal to 3 times the average amplitude of noise fluctuations which corresponds to the standard deviation of the intensity values as measured when the source is off in a preset wavelength range that includes the relevant wavelengths. If $I_C>(I_C)_t$, the peak at $\lambda_C=738$ nm is determined to be present.

If, as a result of the analysis performed in step 105, the intensity peak $I_c$ associated with SiV centers, is determined to be present, the algorithm 100 establishes that the sample 13 is a synthetic CVD diamond (step 106) and the program terminates (step 120) by outputting an indication that the sample 13 is a synthetic CVD diamond.

If, as a result of the analysis, the intensity peak $I_C$ is determined to be absent (e.g., $I_c \leq (I_c)_t$), the algorithm 100 in the check procedure 117, proceeds with a step 107 verifies whether an intensity peak is present or absent at a wavelength of about $\lambda_H=884$ nm, associated in detected spectra at room temperature with nickel (Ni) defects and found almost exclusively in synthetic diamonds produced by HPHT method.

In step 107, the spectral distribution received as an input in step 101, is analyzed by ascertaining the presence or absence of an intensity emission peak $I_H$ at a wavelength of about $\lambda_K=884$ nm. In one embodiment, the step 107 comprises checking whether the intensity in the range $\lambda_c-\Delta\lambda$ and $\lambda_c+\lambda\Delta$, with $\lambda\Delta$ being a predetermined positive value, preferably of nm order, is greater than a predetermined threshold value $(I_c)_t$. For example, $(I_H)_t=3S+((I_H)_p+(I_H)_d)/2$ is calculated from the intensity values $(I_c)_p$ and $(I_c)_d$, as measured, at the wavelengths $\lambda_H-\Delta\lambda$ and $\lambda_H+\Delta\lambda$ respectively and the value 3S is a value equal to 3 times the average amplitude of noise fluctuations which corresponds to the standard deviation of the intensity values as measured when the source is off in a preset wavelength range that includes the relevant wavelengths. If $I_H>(I_H)_t$, the peak at $\lambda_H=884$ nm is determined to be present.

It shall be understood that the intensity threshold values $(I_H)_t$, $(I_C)_t$ and $(I_R)_t$ as well as the values of $\Delta\lambda$, for defining the spectral range of interest, may be the same for the steps 102, 105 and 107 or may be defined as a predetermined different values.

If, as a result of the analysis performed in step 107, the intensity peak $I_H$ associated with Ni centers, is determined to be present, the algorithm establishes that the sample 13 is a synthetic HPHT diamond (step 108) and the program terminates (step 120) by outputting an indication that the sample 13 is a synthetic HPHT diamond.

If, as a result of the analysis of step 107, the intensity peak $I_H$ is determined to be absent (i.e., there was no way of establishing whether the type II diamond is a synthetic HPHT diamond), the algorithm 100 proceeds with a further investigation, generally referenced as check 118, to check whether the diamond under examination emits a phosphorescence signal in the visible spectral region (step 109). When the first light source 12 is off, the second light source 31 is turned on and irradiates the diamond with UV light for a predetermined irradiation time. At the end of the irradiation time, the second light source 31 (e.g., UV excitation) is turned off, and, after a predetermined period of time $t_F$ from the time it is turned off, of the order of fractions of a second, the second photodetector device 37, preferably placed in front of the first lid 33, detects the signals emitted by the sample 13 (e.g., diamond) at its second side. A phosphorescence emission from the diamond will likely indicate that the diamond is a type II synthetic diamond. In one embodiment, phosphorescence is determined to be present if, after the time $t_F$, there is a signal at a wavelength$_F$, during the interval between 400 nm and 600 nm (for example, 550 nm), with an intensity $I_F$ is greater than a predetermined threshold value for the intensity, $(I_F)_v$. For example, the threshold value $(I_F)_v$ is equal to 3S, where S is the average amplitude of noise fluctuations as calculated from the standard deviation of the intensity values measured before illuminating the sample 13.

If the result of step 109 indicates the presence of a phosphorescence signal, the algorithm 100 establishes that the diamond under examination is probably a type II synthetic diamond (110). If the result of step 109 indicates the absence of a phosphorescence signal, the algorithm establishes that the diamond under examination is probably a type II natural diamond (111). In both cases, the program terminates (120) and outputs an indication on the result of the check. For the result 110, for example, a text message "Probably synthetic diamond. Further investigation recommended" is displayed. For the result 111, for example, a text message "Probably natural diamond. Further investigation recommended" is displayed. After the check 118, additional analysis may be suggested to exclude any rare cases of type II phosphorescent natural diamonds and type II non-phosphorescent synthetic diamonds with or without Si and Ni impurities.

In certain embodiments, outputting the indication includes displaying a text message that appears on the display of the PC or mobile terminal, to which the CPU 36 is connected. For example, a text message includes "type I natural diamond", "synthetic CVD diamond", "synthetic HPHT diamond". "not a diamond", etc.

It shall be understood that, although the diagnostic analyses as described above may provide, in certain circumstances and for some steps of the process (e.g. 107 and 109), results that do not identify with absolute certainty the nature of the diamond, the apparatus of the present invention will be able to discriminate in a relatively quick and automatic manner a natural diamond from a synthetic diamond and, if the diamond has been determined to be synthetic, whether it is a CVD or HPHT diamond.

In a different embodiment (not shown), if the result of the analysis of step 107 is that the intensity peak $I_H$ is determined to be absent, the algorithm terminates (120) by outputting an indication that there was no way of establishing whether the diamond is of synthetic or natural origin.

Figure 3:
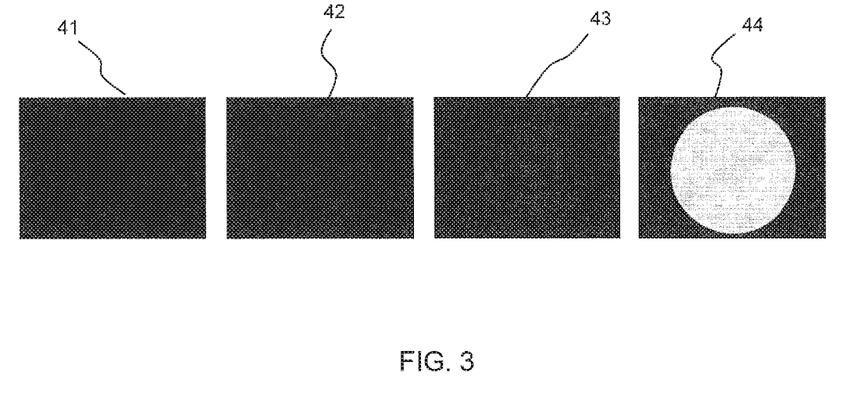
FIG. 3 show some images of diamonds of different types, as taken a few seconds after illumination of the samples with UV light at a wavelength of less than 230 nm, to show phosphorescence emission (if any) according to the synthetic or natural origin of diamond.

FIG. 3 show some images of diamonds of different types, as taken a few fractions of a second after illumination of the samples with UV light at a wavelength of less than 230 nm, to show phosphorescence emission (if any) according to the synthetic or natural origin of diamond. The images 41 and 42 relate to a Type Ia colorless natural diamond and a type IIa colorless natural diamond, both characterized by the absence of phosphorescence. The image 43 shows the weak phosphorescence of a colorless synthetic CVD diamond, whereas the image 44 shows the strong phosphorescence of a colorless synthetic HPHT diamond.

Figure 4:
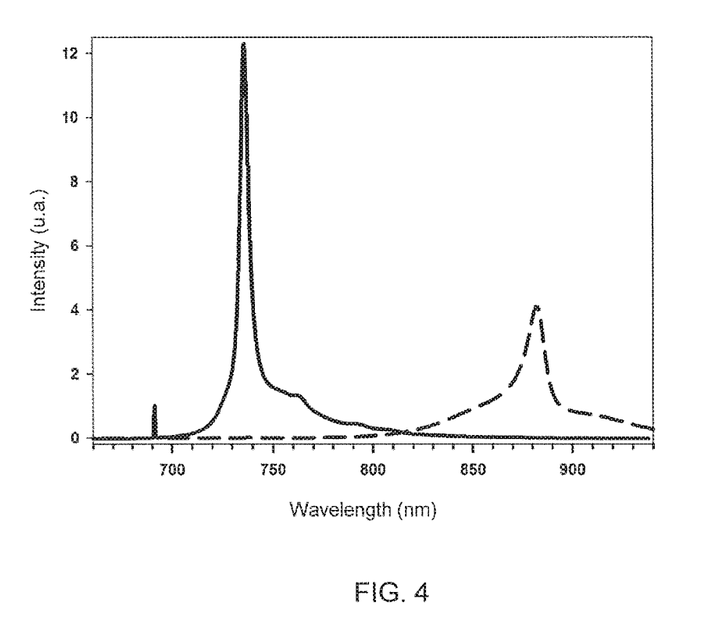
FIG. 4 shows exemplary fluorescence spectra of a synthetic diamond with Si impurities, obtained with a CVD method (continuous line) and a synthetic diamond with Ni impurities produced with a HPHT method (dashed line).

FIG. 4 shows exemplary fluorescence spectra of a synthetic diamond with Si impurities, obtained with a CVD method (continuous line) and a synthetic diamond with Ni impurities produced with a HPHT method (dashed line). The samples were irradiated with a beam of monochromatic light with a wavelength $\lambda_1$ between 550 nm and 680 nm, and their fluorescence was processed by a collection system to provide spectral resolution and consequent detection by an image sensor.

A skilled person may obviously envisage a number of changes to the above described embodiments, without departure from the scope of the appended claims.

The invention claimed is:

1. A spectroscopic analysis apparatus for distinguishing between colorless gems, the apparatus comprising:

a sample holder to retain a gem in an analysis position, wherein the analysis position exposes a first side of the gem and a second side of the gem, opposite to the first side of the gem;

a first light source configured to emit a first primary beam, at an excitation wavelength greater than or equal to 600 nanometers (nm) and less than or equal to 680 nm, directed toward the analysis position to impact on the first side of the gem when the gem is in the sample holder, and to generate emission or diffusion of light;

a second light source configured to emit a second primary beam, comprising ultraviolet (UV) light, wherein the second primary beam is directed toward the analysis position to impact on the first side of the gem;

an optical focusing system configured to focus the light emitted or diffused by the first side of the gem in a secondary optical beam;

a spectral dispersion device configured to collect the secondary optical beam downstream of the optical focusing system and configured to spatially disperse the collected secondary optical beam;

a first photodetector device configured to collect the light spatially dispersed by the spectral dispersion device and configured to output a distribution of spectral intensity as a function of emission wavelength in a range of emission wavelengths greater than or equal to 660 nm and less than or equal to 900 nm;

a second photodetector device, in front of the second side of the gem, configured to detect visible light so as to collect light transmitted through the gem;

a film of fluorescent material, fluorescent to the UV light, configured to be moved between a first position, between the second side of the gem and the second photodetector device, and a second position, external to a field of view of the second photodetector device; and a central processing unit connected to the first light source, the second light source, the first photodetector device, and the second photodetector device, wherein the central processing unit is configured to:

activate the first light source to emit the first primary beam toward the analysis position;

acquire from the first photodetector device the distribution of spectral intensity as the function of emission wavelength;

analyze the distribution of spectral intensity as the function of emission wavelength to determine a presence or absence of a Raman intensity peak, corresponding to a difference in wavenumbers between the light emitted or diffused by the first side of the gem and the excitation wavelength, equal to 1332 cm$^{-1}$;

if, as a result of this first analysis, the Raman intensity peak is determined to be absent, establish that the gem is not a diamond and output an indication that the gem is not a diamond; and if, as the result of the first analysis, the Raman intensity peak is determined to be present, establish that the gem is a diamond and proceed with verifying whether the diamond absorbs the UV light, wherein the verifying whether the diamond absorbs the UV light comprises:

deactivating the first light source and activating the second light source to emit the second primary beam toward the analysis position;

positioning the film of material, fluorescent to the UV light, in the first position so that the second primary beam transmitted through the gem interacts with the film of material, fluorescent to the UV light, to generate visible light detectable by the second photodetector device;

acquiring, from the second photodetector device, a fluorescence signal representative of the UV light transmitted through the gem; and analyzing the fluorescence signal to determine whether fluorescence intensity is greater than, less than, or equal to a predetermined transmission threshold value;

if, as a result of this second analysis, the fluorescence intensity is determined to be less than or equal to the predetermined transmission threshold value, establishing that the gem is a type I natural diamond and outputting an indication that the gem is a natural diamond; and if, as a result of the second analysis, the fluorescence intensity is determined to be greater than the predetermined transmission threshold value, establishing that the gem is a type II diamond and outputting an indication that the gem is a type II diamond.

2. The apparatus of claim 1, wherein the central processing unit is further configured to, after establishing that the gem is a type II diamond:

deactivate the second light source and activate the first light source to emit the first primary beam toward the analysis position; and acquire from the first photodetector device the distribution of spectral intensity as the function of emission wavelength and analyze the distribution of spectral intensity as the function of emission wavelength to determine a presence or absence of an intensity peak at a wavelength of approximately 738 nm;

if, as a result of this third analysis, the intensity peak at the wavelength of approximately 738 nm is determined to be present, establishing that the gem is a synthetic chemical vapor deposition (CVD) diamond and outputting an indication that the gem is a synthetic CVD diamond; and if, as a result of the third analysis, the intensity peak at the wavelength of approximately 738 nm is determined to be absent, proceeding with:

analyzing the distribution of spectral intensity as the function of emission wavelength to determine a presence or absence of an intensity peak at a wavelength of approximately 884 nm; and if, as a result of this fourth analysis, the intensity peak at the wavelength of approximately 884 nm is determined to be present, establishing that the gem is a synthetic high pressure, high temperature (HPHT) diamond and outputting an indication that the gem is a synthetic HPHT diamond.

3. The apparatus of claim 2, wherein the central processing unit is further configured to:

if, as a result of the fourth analysis, the intensity peak at the wavelength of approximately 884 nm is determined to be absent, proceeding with verifying whether the gem emits a phosphorescence signal in a visible spectral region, wherein whether the gem emits the phosphorescence signal comprises:

deactivating the first light source and activating the second light source for a predetermined irradiation time, emitting the second primary beam toward the analysis position; and at an end of the predetermined irradiation time, deactivating the second light source and, after a first time from deactivation, acquiring the phosphorescence signal from the second photodetector device;

if, as a result of this fifth analysis, phosphorescence intensity is determined to be greater than or equal to a phosphorescence intensity threshold value, establishing that the gem is a type II synthetic diamond and outputting an indication that the gem is a type II synthetic diamond; and if, as a result of the fifth analysis, the phosphorescence intensity is determined to be less than the phosphorescence intensity threshold value, establishing that the gem is a type II natural diamond and outputting an indication that the gem is a type II natural diamond.

4. The apparatus of claim 1, wherein the sample holder comprises a lid configured to be moved between a first detection position, in which the lid is above the gem at the second side of the gem, and a second detection position, distant from the gem, and wherein the film of material, fluorescent to the UV light, is on an inner side of the lid so that, in the first detection position, the second photodetector device can collect fluorescence light.

5. The apparatus of claim 1, wherein the sample holder comprises a through-opening and a mounting and/or clamping mechanism configured to hold the gem on the through-opening so as to expose the first side of the gem and the second side of the gem.

6. A spectroscopic analysis method for distinguishing between colorless gems, the method comprising:

positioning a gem in an analysis position, wherein the analysis position exposes a first side of the gem and a second side of the gem, opposite to the first side;

directing a first primary beam, emitted by a first light source at an excitation wavelength greater than or equal to 600 nanometers (nm) and less than or equal to 680 nm, toward the analysis position to impact on the first side of the gem and to generate emission or diffusion of light;

focusing and spatially dispersing the light emitted or diffused by the first side of the gem;

detecting the spatially dispersed light and producing a distribution of spectral intensity as a function of emission wavelength using a first photodetector device in a range of emission wavelengths greater than or equal to 660 nm and less than or equal to 900 nm;

acquiring from the first photodetector device the distribution of spectral intensity as the function of emission wavelength; and analyzing the distribution of spectral intensity as the function of emission wavelength to determine a presence or absence of a Raman intensity peak, corresponding to a difference in wavenumbers between the light emitted or diffused by the first side of the gem and the excitation wavelength, equal to 1332 cm$^{-1}$;

if, as a result of this first analysis, the Raman intensity peak is determined to be absent, establishing that the gem is not a diamond and outputting an indication that the gem is not a diamond; and if, as a result of the first analysis, the Raman intensity peak is determined to be present, establishing that the gem is a diamond and proceeding with verifying whether the diamond absorbs ultraviolet (UV) light, wherein verifying whether the diamond absorbs the UV light comprises:

deactivating the first light source and activating a second light source configured to emit a second primary beam comprising the UV light toward the analysis position to impact on the first side of the gem;

positioning a film of material, fluorescent to the UV light, at the second side of the gem so that the second primary beam, transmitted through the gem, interacts with the film of material, fluorescent to the UV light, to generate visible light; and acquiring, using a second photodetector device, the visible light emitted by the film of material, fluorescent to the UV light, to output a fluorescence signal representative of the UV light transmitted through the gem and analyzing the fluorescence signal to determine whether fluorescence intensity is greater than, less than, or equal to a predetermined transmission threshold value;

if, as a result of this second analysis, the fluorescence intensity is determined to be less than or equal to the predetermined transmission threshold value, establishing that the gem is a type I natural diamond and outputting an indication that the gem is a natural diamond; and if, as a result of the second analysis, the fluorescence intensity is determined to be greater than the predetermined transmission threshold value, establishing that the gem is a type II diamond and outputting an indication that the gem is a type II diamond.

7. The method of claim 6, further comprising, after establishing that the gem is a type II diamond:

deactivating the second light source and activating the first light source to emit the first primary beam toward the analysis position; and acquiring, from the first photodetector device the distribution of spectral intensity as the function of emission wavelength and analyzing the distribution of spectral intensity as the function of emission wavelength to determine a presence or absence of an intensity peak at a wavelength of approximately 738 nm;

if, as a result of this third analysis, the intensity peak of approximately 738 nm is determined to be present, establishing that the gem is a synthetic chemical vapor deposition (CVD) diamond and outputting an indication that the gem is a synthetic CVD diamond; and if, as a result of the third analysis, the intensity peak of approximately 738 nm is determined to be absent, proceeding with:

analyzing the distribution of spectral intensity as the function of emission wavelength to determine a presence or absence of an intensity peak at a wavelength of approximately 884 nm; and if, as a result of this fourth analysis, the intensity peak of approximately 884 nm is determined to be present, establishing that the gem is a synthetic high pressure, high temperature (HPHT) diamond and outputting an indication that the gem is a synthetic HPHT diamond.

8. The method of claim 7, further comprising:

if, as a result of the fourth analysis, the intensity peak of approximately 884 nm is determined to be absent, proceed with verifying whether the gem emits a phosphorescence signal in a visible spectral region, wherein verifying whether the gem emits a phosphorescence signal in the visible spectral region comprises:

deactivating the first light source and activating the second light source for a predetermined irradiation time, emitting the second primary beam toward the analysis position;

at an end of the predetermined irradiation time, deactivating the second light source and, after a first time from deactivation, acquiring a phosphorescence signal using the second photodetector device; and analyzing the phosphorescence signal to determine whether phosphorescence intensity at a first wavelength in the visible spectral region, greater than or equal to 400 nm and less than or equal to 600 nm, is greater than, less than, or equal to a phosphorescence intensity threshold value;

if, as a result of this fifth analysis, the phosphorescence intensity is determined to be greater than or equal to the phosphorescence intensity threshold value, establishing that the gem is a type II synthetic diamond and outputting an indication that the gem is a type II synthetic diamond; and if, as a result of the fifth analysis, the phosphorescence intensity is determined to be less than the phosphorescence intensity threshold value, establishing that the gem is a type II natural diamond and outputting an indication that the gem is a type II natural diamond.

9. The method of claim 6, wherein outputting the indication that the gem is a natural diamond or that the gem is a type II diamond comprises displaying message text on a display.

10. A portable spectroscopic analysis apparatus for distinguishing between colorless gems, the apparatus comprising:

a sample holder to retain a gem in an analysis position, wherein the analysis position exposes a first side of the gem and a second side of the gem, opposite to the first side of the gem;

a first light source configured to emit a first primary beam, at an excitation wavelength greater than or equal to 550 nanometers (nm) and less than or equal to 680 nm, directed toward the analysis position to impact on the first side of the gem when the gem is in the sample holder, and to generate emission or diffusion of light;

a second light source configured to emit a second primary beam, comprising ultraviolet (UV) light, wherein the second primary beam is directed toward the analysis position to impact on the first side of the gem;

an optical focusing system configured to focus the light emitted or diffused by the first side of the gem in a secondary optical beam;

a spectral dispersion device configured to collect the secondary optical beam downstream of the optical focusing system and configured to spatially disperse the collected secondary optical beam;

a first photodetector device configured to collect the light spatially dispersed by the spectral dispersion device and configured to output a distribution of spectral intensity as a function of emission wavelength in a range of emission wavelengths greater than or equal to 600 nm and less than or equal to 950 nm;

a second photodetector device, in front of the second side of the gem, configured to detect visible light so as to collect light transmitted through the gem;

a film of material, fluorescent to the UV light, configured to move between a first position, between the second side of the gem and the second photodetector device, and a second position, external to a field of view of the second photodetector device; and a central processing unit connected to the first light source, the second light source, the first photodetector device, and the second photodetector device, wherein the central processing unit is configured to:

activate the first light source to emit the first primary beam toward the analysis position;

acquire from the first photodetector device the distribution of spectral intensity as the function of emission wavelength;

analyze the distribution of spectral intensity as the function of emission wavelength to determine a presence or absence of a Raman intensity peak, corresponding to a difference in wavenumbers between the light emitted or diffused by the first side of the gem and the excitation wavelength, equal to 1332 cm$^{-1}$;

if, as a result of this first analysis, the Raman intensity peak is determined to be absent, establish that the gem is not a diamond and output an indication that the gem is not a diamond; and if, as the result of the first analysis, the Raman intensity peak is determined to be present, establish that the gem is a diamond and proceed with verifying whether the diamond absorbs the UV light, wherein the verifying whether the diamond absorbs the UV light comprises:

deactivating the first light source and activating the second light source to emit the second primary beam toward the analysis position;

positioning the film of material, fluorescent to the UV light, in the first position so that the second primary beam transmitted through the gem interacts with the film of material, fluorescent to the UV light, to generate visible light detectable by the second photodetector device;

acquiring, from the second photodetector device, a fluorescence signal representative of the UV light transmitted through the gem; and     analyzing the fluorescence signal to determine whether fluorescence intensity is greater than, less than, or equal to a predetermined transmission threshold value;

if, as a result of this second analysis, the fluorescence intensity is determined to be less than or equal to the predetermined transmission threshold value, establishing that the gem is a type I natural diamond and outputting an indication that the gem is a natural diamond; and     if, as the result of the second analysis, the fluorescence intensity is determined to be greater than the predetermined transmission threshold value, establishing that the gem is a type II diamond and outputting an indication that the gem is a type II diamond.

11. The apparatus of claim 10, wherein the first light source emits monochromatic light.

12. The apparatus of claim 10, wherein the first light source comprises a light-emitting diode (LED).

13. The apparatus of claim 10, wherein the first light source comprises a laser.

14. The apparatus of claim 10, wherein the excitation wavelength is greater than or equal to 600 nm.

15. The apparatus of claim 10, wherein the excitation wavelength is 633 nm or 650 nm.

16. The apparatus of claim 10, wherein a wavelength of the UV light emitted from the second light source is greater than or equal to 180 nm and less than or equal to 370 nm.

17. The apparatus of claim 10, wherein a wavelength of the UV light emitted from the second light source is less than or equal to 230 nm.

18. The apparatus of claim 10, wherein a wavelength of the UV light impacting on the first side of the gem is less than or equal to 230 nm.

19. The apparatus of claim 10, wherein the UV light emitted from the second light source is non-monochromatic.

20. The apparatus of claim 10, wherein if, as the result of the second analysis, the fluorescence intensity is determined to be less than or equal to the predetermined transmission threshold value, establishing that the gem is the type I natural diamond and outputting an indication that the gem is the type I natural diamond.

* * * * *